United States Patent [19]

Pinkerton et al.

[11] Patent Number: 5,345,128
[45] Date of Patent: Sep. 6, 1994

[54] MAGNETIC BEARING WITH CLOSED LOOPS WHICH MOVE IN AC ELECTROMAGNET FIELD AND/OR WHICH INCLUDE CAPACITORS

[75] Inventors: Joseph F. Pinkerton, Austin; David B. Clifton, Leander; Scott R. Little, Austin, all of Tex.

[73] Assignee: Magnetic Bearing Techologies, Inc., Austin, Tex.

[21] Appl. No.: 95,377

[22] Filed: Jul. 23, 1993

Related U.S. Application Data

[63] Continuation-in-part of Ser. No. 950,607, Sep. 25, 1992, abandoned, and a continuation-in-part of Ser. No. 996,192, Dec. 23, 1992, Pat. No. 5,302,874.

[51] Int. Cl.⁵ .............................................. H02K 7/09
[52] U.S. Cl. ................................................. 310/90.5
[58] Field of Search .......................... 310/90.5, 68 R

[56] References Cited

U.S. PATENT DOCUMENTS

| | | | |
|---|---|---|---|
| 4,634,191 | 1/1987 | Studer | 310/90.5 |
| 4,644,205 | 2/1987 | Sudo et al. | 310/90.5 |
| 4,734,601 | 3/1988 | Lewis | 310/68 E |

Primary Examiner—Steven L. Stephan
Assistant Examiner—E. To
Attorney, Agent, or Firm—Beveridge, DeGrandi, Weilacher & Young

[57] ABSTRACT

An alternating current electromagnet is used in a magnetic bearing in which one or more electrically conductive loops travel on a prescribed path through a magnetic field produced by the electromagnet. An electrical current is induced in the loop whenever it deviates from its prescribed path. A power supply drives the electromagnet(s) at a frequency at which the magnetic field interacts with the currents induced in the loop to force a deviant loop laterally toward the prescribed path. Capacitors may be connected in series with the loops to provide them with the desired reactances.

41 Claims, 6 Drawing Sheets

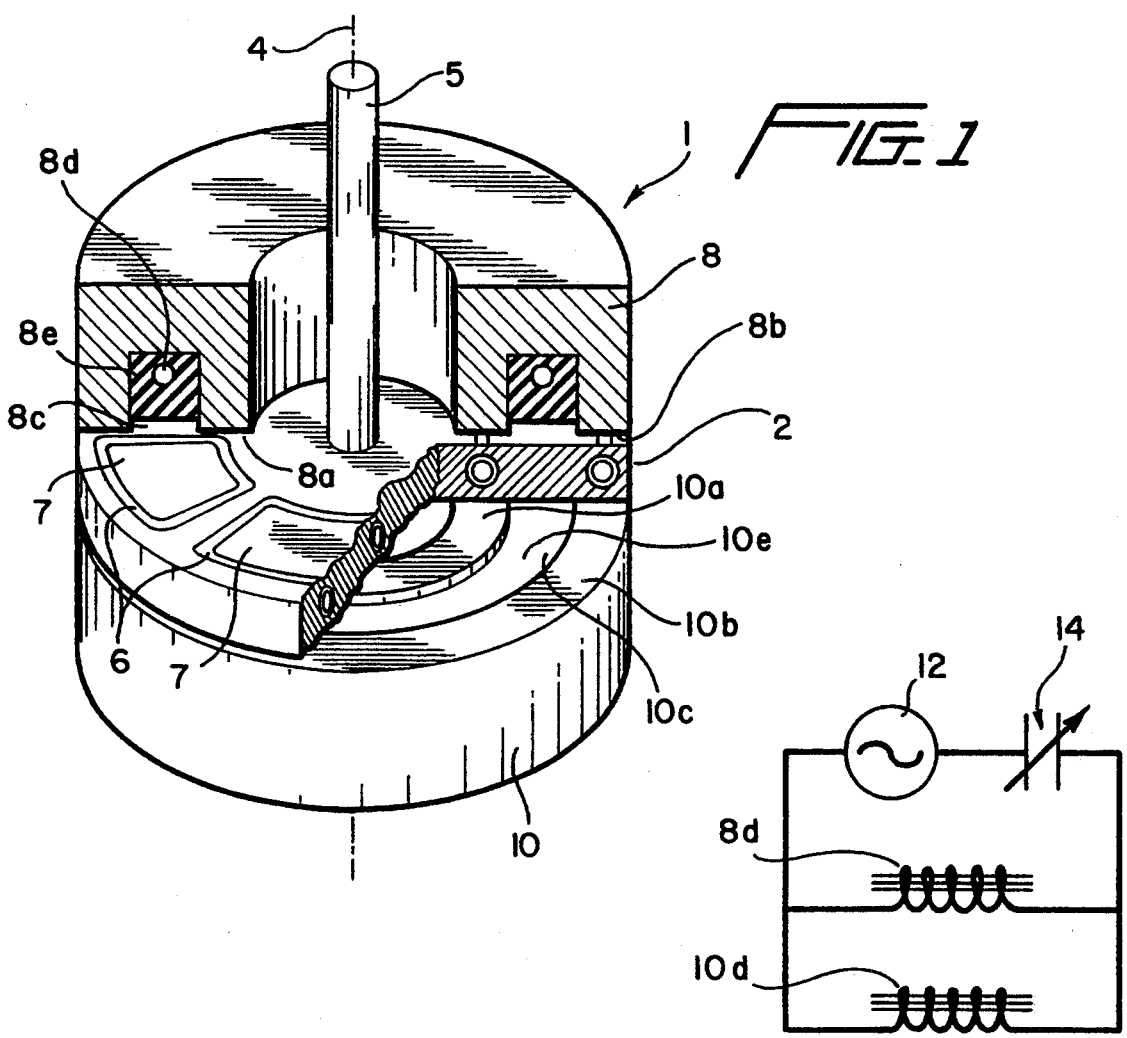
FIG. 1
FIG. 2
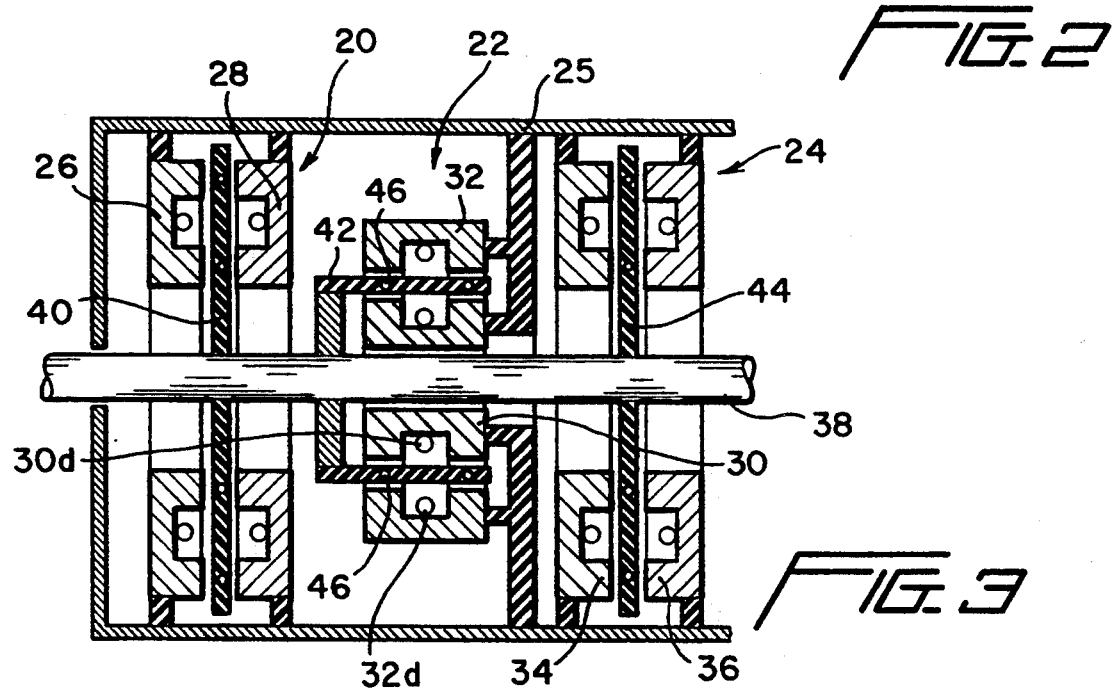
FIG. 3

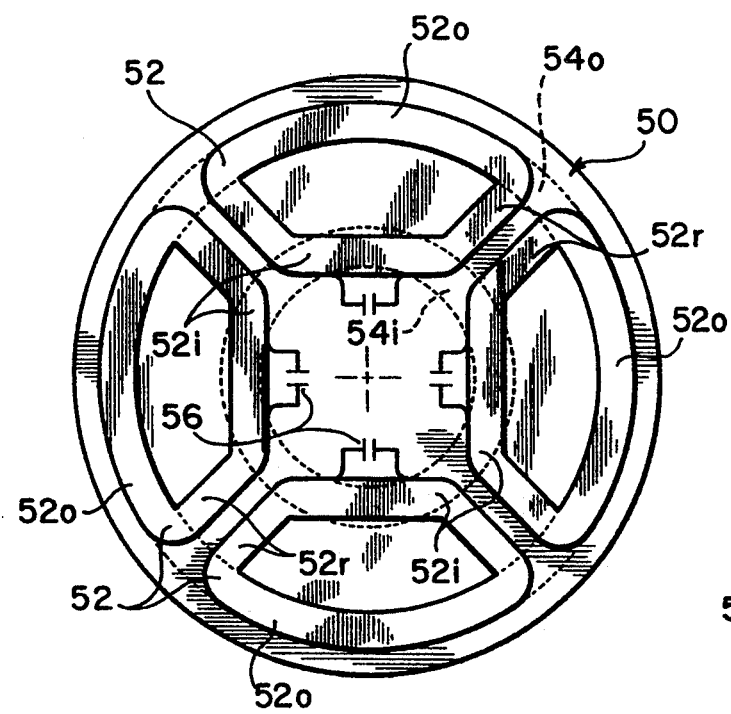
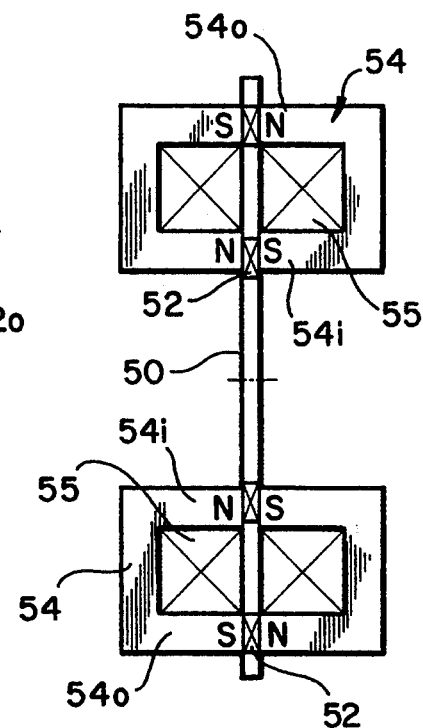
FIG. 6A  FIG. 6B
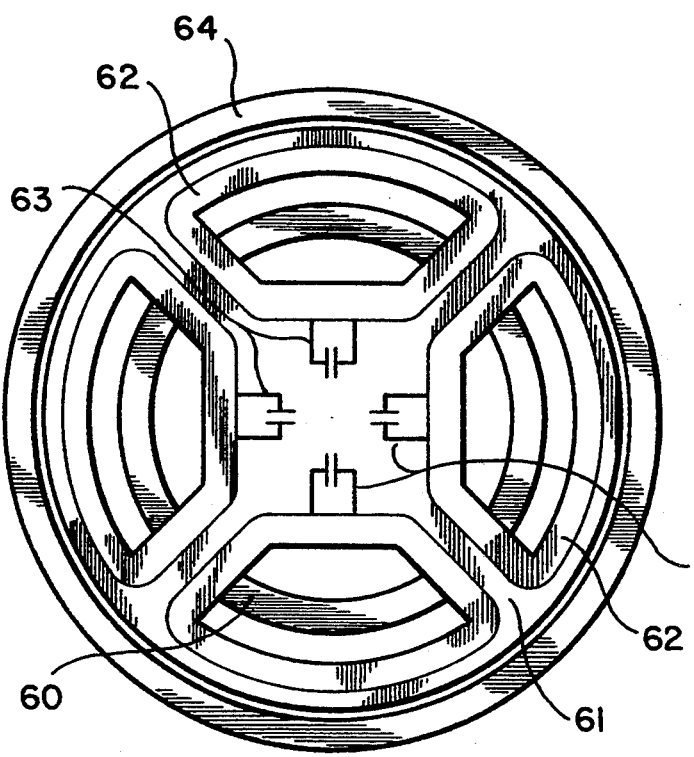
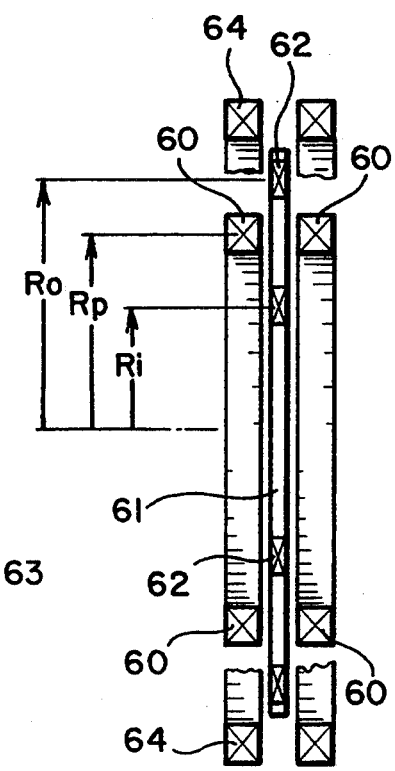
FIG. 7A  FIG. 7B

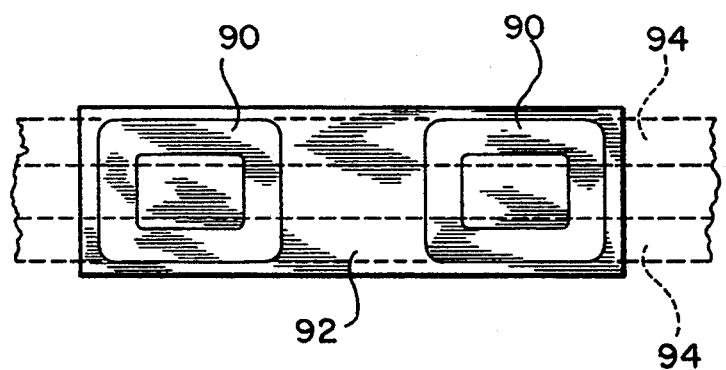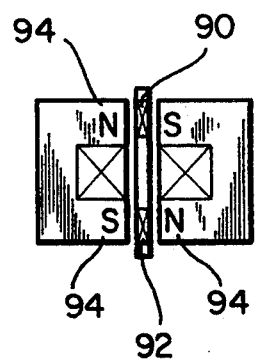
FIG. 10A  FIG. 10B
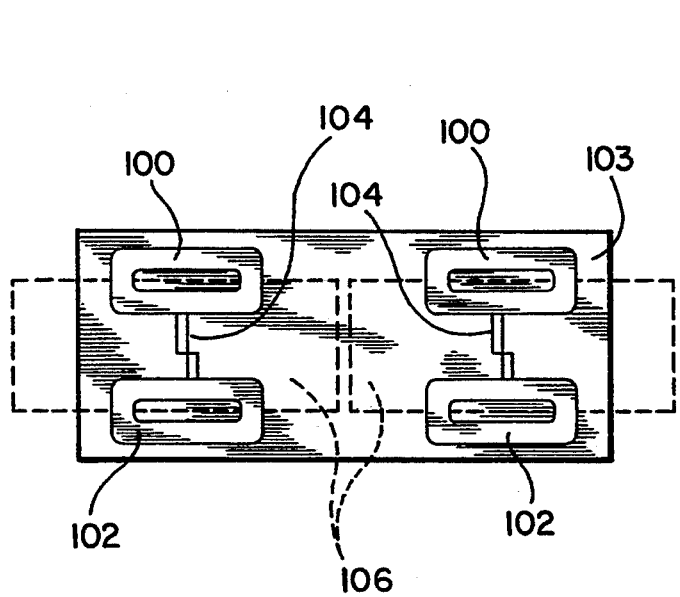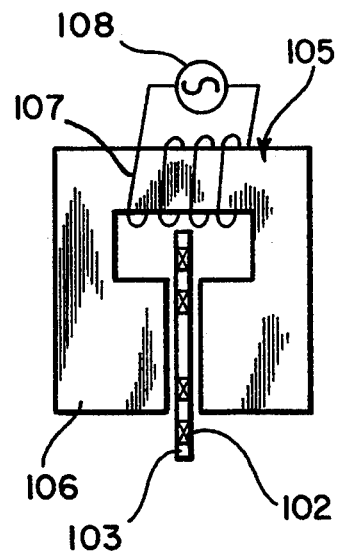
FIG. 11A  FIG. 11B

MAGNETIC BEARING WITH CLOSED LOOPS WHICH MOVE IN AC ELECTROMAGNET FIELD AND/OR WHICH INCLUDE CAPACITORS

REFERENCE TO RELATED APPLICATIONS

This is a continuation-in-part of U.S. patent application 07/950,607 filed Sep. 25, 1992, now abandoned and U.S. patent application 07/996,192 filed Dec. 23, 1992, now U.S. Pat. No. 5,302,874.

BACKGROUND OF THE INVENTION

During previous experimentation, one of the present inventors successfully designed and operated a passive magnetic bearing in which loops on a rotor travelled in a circular path through magnetic fields created by a circular array of stationary permanent magnets. Circumferentially adjacent poles of the magnets had opposite polarities. Each loop had outboard and inboard portions which each travelled successively through a respective set of oppositely directed magnetic fields. For optimum performance, the lengths and electrical characteristics of the loops were custom designed for different installations. The optimum loop lengths depended on the corresponding lengths of the magnets, and the loop inductances and resistances were selected to provide a desired degree of stiffness at the design angular velocity of the bearing. When a bearing of this type used permanent magnets exclusively, its stiffness was dependent on the angular velocity of the bearing, so its stiffness was quite low at low velocities. Energy losses were experienced due to the inhomogeneous character of the magnetic fields.

A bearing according to the present invention has certain advantages over the bearings described in the preceding paragraph. According to one feature of the invention, the fields are created by alternating current so the satisfactory operation and stiffness of the bearing is not exclusively dependent on the inductance or resistance of the loops. The frequency and current supplied to the windings of the electromagnet are variable so that adjustments can be made to optimize the bearing's operation without reconfiguring the hardware. The stiffness of the bearing is not substantially dependent on or affected by the angular velocity of the bearing.

Unlike some previously proposed magnetic bearing systems, the bearings of this invention are not dependent on rotational movement. This bearing will even maintain the rotor at a desired position when all components are stationary.

Fine tuning of a magnetic bearing can be difficult, and it sometimes has required the rewinding of the rotor loops to change their inductive reactances and other electrical characteristics. To solve this aspect of fine tuning, capacitors are wired in series with the loop windings. By changing the capacitors or their capacitances, the loops may be given optimum electrical characteristics for a particular bearing installation.

In another respect, in bearings according to the invention, the magnetic fields are homogeneous to minimize energy losses. The fields have constant polarities along the loop path, so they operate effectively with loops of differing lengths.

Bearings constructed according to this invention can take many forms, some of which are shown and described below.

SUMMARY OF THE INVENTION

According to the invention, a magnetic bearing includes an object which has a closed loop of electrically conductive material which moves along a prescribed path relative to an electromagnet. A power supply provides alternating current to the electromagnet to create a field of magnetic flux which changes directions periodically. The loop forms a boundary of a loop interior area, and the loop is arranged and positioned where it is exposed to the magnetic flux from the electromagnet so that an electrical current will be induced in the loop whenever it deviates from its prescribed path. The power supply operates at a frequency at which the magnetic flux interacts with the electrical currents induced in the loop to exert forces on the loop in a direction which is lateral with respect to the prescribed path of the loop. This tends to move the loop, when it deviates from the path, back toward the prescribed path in a lateral direction.

In another respect, the magnetic bearing of the invention includes an object which has closed loops of electrically conductive material which are unconnected to any electrical power supply and which move along a prescribed path relative to an electromagnet which has first and second poles of opposite polarities. Each loop forms a boundary of a loop interior area, and this interior area is positioned where it is simultaneously exposed to magnetic flux associated with the first and second poles of the electromagnet so that an electrical current will be induced in the loop whenever the flux associated with one pole passing through its interior is unequal to the flux associated with the other pole passing through its interior. A power supply provides alternating current to the windings of the magnet so that the polarities of the magnet poles change periodically. The power supply operates at a frequency at which the magnetic flux associated with the poles interacts with the electrical currents induced in the loops to exert forces on the loops in a direction which is lateral with respect to the prescribed path of the loops. This tends to move any loop which deviates from the path back toward the prescribed path in a lateral direction.

Preferably, the magnet poles are circular, the magnet is stationary, the loops are movable, and two or more electromagnets are used, positioned on opposite sides of the object with closed loops. The power supply has a frequency of at least 500 Hz., a range of about 500 to 25000 Hz., and it includes means for varying this frequency. The poles of the electromagnet are separated by a space in which electrical windings are located.

When the bearing is a rotary bearing, the prescribed path is a circular path with a central axis. The bearing may be a radial bearing on an axial bearing. The first and second poles of the magnet may face axially and be radially spaced from each other; or, they may face radially and be axially spaced from each other. There can be two or more electromagnets and two or more sets of loops, with a first of these electromagnets having its poles facing radially toward a first set of loops and a second of these electromagnets having its poles facing axially toward a second set of loops. When all loops are on their prescribed paths, flux associated with the first pole passing through the interior of a loop can be equal and opposite to the flux associated with the second pole passing through the interior of the same loop.

According to another feature of the invention, capacitors are connected in series with closed loops of electrically conductive material which moves along a prescribed path relative to an electromagnet or a permanent magnet. Each loop forms a boundary of a loop interior area, and the loop is unconnected to any electrical power supply. It is arranged and positioned where it is exposed to magnetic flux associated with the magnet so that an electrical current will be induced in the loop whenever the loop deviates from its prescribed path. Magnetic flux emanating from the magnet interacts with the electrical currents induced in the loop to exert forces on the loop in a direction which is lateral with respect to the prescribed path of the loop. This tends to move the loop, when it deviates from the path, back toward the prescribed path in a lateral direction.

BRIEF DESCRIPTION OF THE DRAWINGS

FIG. 1 is a perspective view illustrating one embodiment of the invention.

FIG. 2 is a simple circuit diagram illustrating the power supply used in connection with the invention.

FIG. 3 is a sectional view of a bearing system which has both radial and axial bearings.

FIGS. 6A and 6B are diagrammatic front and sectional views of a preferred embodiment of the invention.

FIGS. 7A and 7B are diagrammatic front and sectional views of an embodiment of the invention in which magnetic flux is produced by air core magnets.

FIGS. 10A and 10B are diagrammatic side and transverse sectional views of a linear bearing constructed according to the invention, in which each loop is simultaneously exposed to two oppositely directed magnetic fields.

FIGS. 11A and 11B are diagrammatic side and transverse sectional views of an embodiment in which two electrically interconnected loops are simultaneously exposed to only one magnetic field.

DETAILED DESCRIPTION

Figure 4:
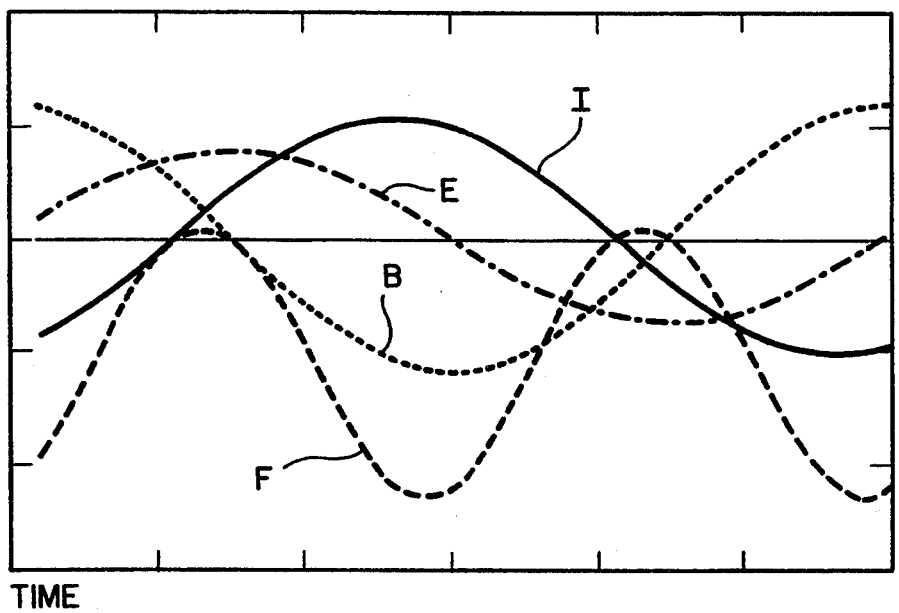
FIG. 4 is a graph which indicates the magnitude of voltages, average currents, magnetic fields, and average forces as a function of time when there are no series capacitors in the rotor loops.

FIG. 1 shows a simple radial bearing system 1 in which an object, a circular disk 2, is rotatable about a central axis 4. A shaft 5 is rotationally fixed to the disk, and thus it is supported by the bearing.

The disk 2 is formed of a nonmagnetic, electrically nonconducting material with embedded closed loops 6 of electrically conductive material. In a rotary bearing, the loops 6 should travel in a prescribed circular path. Each loop 6 is unconnected electrically to any external power supply, and it forms the boundary of a loop interior area 7.

The disk 2 is located between two stationary electromagnets 8 and 10 which are physically identical to each other and are located on opposite sides of the disk 2. They are preferably made of ferrite, and they have circular inboard poles 8a, 10a and circular outboard poles 8b, 10b. These poles are concentric with the bearing axis 4, they face axially, and they are radially spaced from each other to provide recesses 8c, 10c in which electrical windings 8d, 10d are located. The windings 10d, shown in FIG. 2, are in the recess 10c of FIG. 1. Each of the windings 8d, 10d is formed of a single coil having multiple turns of electrically conductive wire. The windings are embedded in bodies of nonmagnetic material 8e, 10e between the magnet poles.

Each loop is positioned where its interior area 7 is simultaneously exposed to magnetic flux associated with both poles of each magnet 8 and 10.

When the amount of flux passing through the interior area of a loop from one pole is different from the amount of flux associated with the other pole, an electrical current will be induced in the loop. The direction of this current depends on whether the greater amount of flux is associated with the inboard pole or the outboard pole.

The power supply 12 for the electromagnets is shown in FIG. 2 where it will be seen that it provides an alternating current, the frequency of which can be varied automatically or by an operator. The power supply is connected to the two windings 8d, 10d so that the polarity of the upper electromagnet 8 is always opposite to the polarity of the lower electromagnet 10. The power supply includes a variable capacitor 14 which reduces the reactance of the circuit. This is particularly beneficial at higher frequencies at which the inductive reactance can otherwise become quite high. The capacitance can be adjusted so that the operating frequency will be near the resonant frequency of the circuit.

When the loops 6 are on their prescribed path, the L-C circuit formed by the AC source 12, variable capacitor 14 and the electromagnet windings 8d, 10d is in a non-resonant state. The inductance of the electromagnet windings is fixed, so the non-resonant state is obtained by adjusting the frequency of the AC source and/or the capacitance of the variable capacitor. More specifically, the circuit formed by the AC source, variable capacitor and electromagnet windings should resonate at a frequency that is higher than the operating frequency. This will reduce power consumption and prevent overheating when the loop is on its prescribed path. It also will permit the utilization of smaller magnets.

When a loop 6 is displaced from its prescribed path a maximum distance before the rotor assembly contacts a mechanical bearing or other stop device, current will flow in the loop, and there will be mutual inductance between the loop 6 and the electromagnet windings 8d, 10d. This mutual inductance affects the circuit formed by the AC power source, the variable capacitor, and the electromagnet windings. It lowers the overall inductance of the circuit, so that it becomes a resonant circuit at the operating frequency.

The power supply is preferably operated at a frequency of at least about 500 Hz. The magnetic polarities of the poles 8a, 8b, 10a, 10b will change periodically at the frequency established by the power supply. These polarities are such that the flux interacts with the electrical currents induced in the loops to exert forces on the loops in directions which are transverse with respect to the paths of the loops. These forces will be in a direction which would tend to move any loop which has deviated from the prescribed path in a direction laterally toward the prescribed path.

The bearing therefore tends to bias the loops in a direction which is lateral to the prescribed paths in order to maintain the loops on the prescribed path. In a radial bearing such as shown in FIG. 1, this lateral direction is radial with respect to the bearing axis 4.

In some situations, it is desirable to support a moving body both axially and radially. A bearing system suitable for such a situation is illustrated in FIG. 3. It has an axial bearing 22 located between two radial bearings 20 and 24. The radial bearings 20 and 24 are identical in construction and operation to the bearing 1 shown in FIG. 1 except that their central axes are horizontal rather than vertical in the FIG. 3 embodiment. The embodiments shown in FIGS. 1 and 3 can both operate with either vertical or horizontal axes of rotation.

The bearing system of FIG. 3 has a housing 25 from which the electromagnets 26, 28, 30, 32, 34, and 36 are supported. The shaft 38 which is supported by the bearing carries loop-supporting members 40, 42, and 44.

The axial bearing 22 includes conductive loops 46 embedded in a nonmagnetic cylinder 42. The loops 46 are positioned radially between the two concentric electromagnets 30 and 32.

The inboard magnet 30 has outwardly facing cylindrical poles, and the outboard magnet 32 has inwardly facing cylindrical poles. In each magnet 30, 32, the two poles are axially spaced from each other, and the space between these poles is occupied in part by windings 30d, 32d which are connected to a power supply of the type illustrated in FIG. 2. Both electromagnets 30, 32 can be a connected to a common power supply, wired in series or in parallel with each other.

When the shaft 38 is displaced axially so that the loops 46 in cylinder 42 are not on their prescribed paths, the interior areas of the loops will be subjected to unequal amounts of flux from the two poles of each of the electromagnets 30, 32. This inequality will cause current to flow in each of the loops 46. The output frequency of the power source is such that the magnetic flux associated with the poles of bearings 30 and 32 interacts with the electrical currents induced in the loops to exert forces on the loops in an axial direction, i.e. a direction which is transverse with respect to the prescribed path of the loops. This tends to move any deviant loops laterally (axially in this case) and toward their prescribed paths.

FIG. 4 is of interest in the respect that it shows the phase relationship between the various parameters associated with the apparatus. The ordinate of this graph is in units of time, and the abscissa shows, on different scales, the net voltage of a rotor loop at E, the sine wave current in a laterally displaced rotor loop at I, the magnetic field strength (in Tesla) in the air gap of the electromagnet at B, and the magnitude of restorative forces F (in Newtons) which occur when needed to restore a loop toward its prescribed path. The latter happens to be negative in this example. It would be positive if the rotor loop were displaced in the opposite direction.

Figure 5:
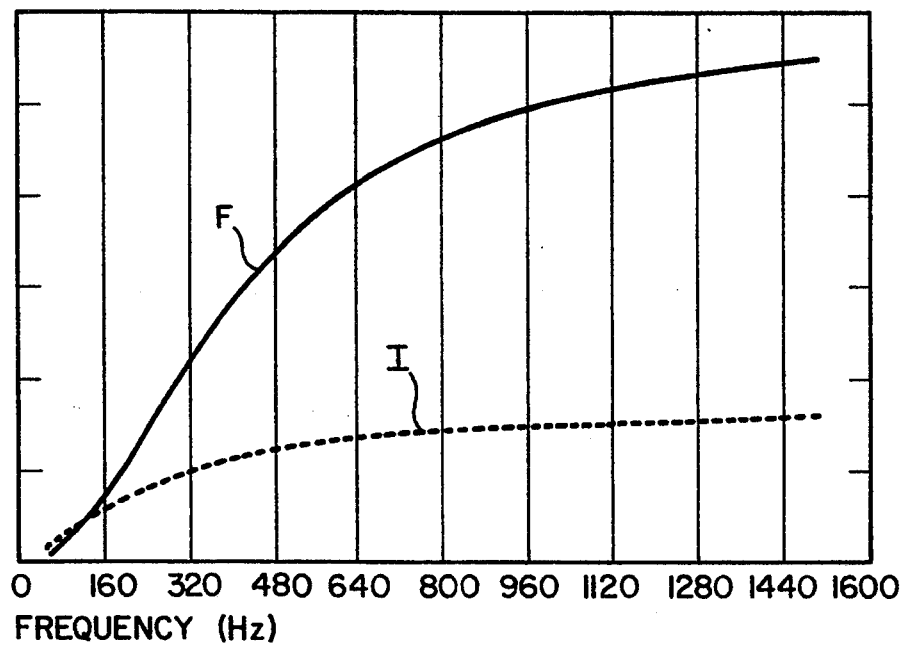
FIG. 5 is a graph which shows the magnitude of restorative forces and average currents as a function of frequency when there are no series capacitors in the rotor loops.

It has been discovered that the magnitude of the restorative force and the magnitude of the current induced in a loop is dependent in part upon the frequency of the alternating current supplied to the respective magnets. This relationship is illustrated in FIG. 5 which shows the average current I on a laterally displaced rotor loop and the average restorative force F on a displaced loop. The values of both of these parameters increase with frequency. Most of the increase occurs before the frequency reaches 1000 Hz., so apparatus made according to the invention is preferably operated above 500 Hz., and in the range of about 500–25000 Hz.

FIGS. 6A and 6B show a rotary bearing according to the invention which has preferred proportions as to the relative sizes of the components. The rotor components are shown in solid lines, and the edges of the annular pole faces are shown in broken lines.

The rotor 50 has four loops 52 which each include two radial legs 52r, an outboard leg 52o, and an inboard leg 52i. Wires of 0.002 inch diameter are wound to form the loops 52. The outboard and inboard legs of the loops face the outboard poles 54o and inboard poles 54i of the magnets 54, and the widths of the legs 52o, 52i are substantially equal to the widths of the pole faces 54o, 54i. The term "width" in this instance refers to the radial dimensions of the components.

In the embodiment of FIGS. 6A and 6B, the stationary magnet windings 55 are 0.1 inch diameter litz wires which are wound to fill the space between the poles 54o and 54i. The windings are connected to an alternating current power supply, so the polarities of the magnet poles change at a frequency which corresponds with the frequency of the alternating current.

As shown schematically in FIG. 6A, capacitors 56 are wired in series in the rotating loops. Such capacitors are desirable when the frequency of the alternating current is greater than about 1000 Hz. Preferably, the capacitance is slightly larger than $$\frac{1}{(2\pi f)^2 L}$$

where f is the frequency of the alternating current power supply and L is the inductance of the respective loop 52.

The use of capacitors 56 makes it relatively convenient to change the net reactance of a loop 52 without rewinding or replacing the entire loop. It is only necessary to replace the capacitor 56 with a capacitor which has a different capacitance. Any level of compensation can be achieved by using the LC resonant circuit in order to increase the maximum stiffness of the bearing at high frequencies. Loop windings with such capacitances also have potential benefits in magnetic bearings which use permanent magnets or direct current electromagnets. Examples of such bearings are provided in copending patent application Ser. Nos. 07/950,607 and 07/996,192 which are incorporated herein by reference.

Figure 6C:
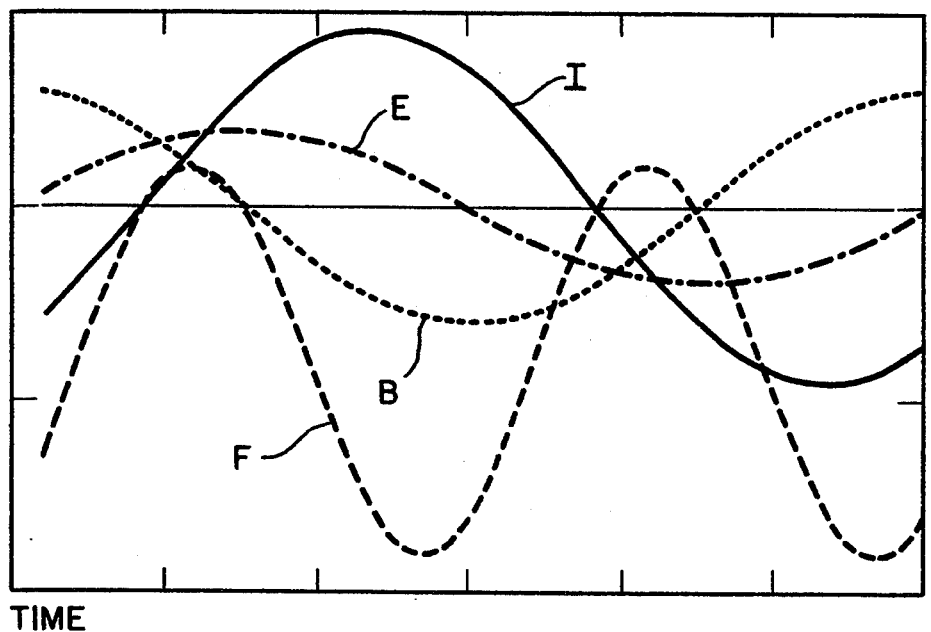
FIGS. 6C and 6D are graphs which correspond to FIGS. 4 and 5, showing the characteristics of bearing of FIGS. 6A and 6B, in which the loops include series capacitors.
Figure 6D:
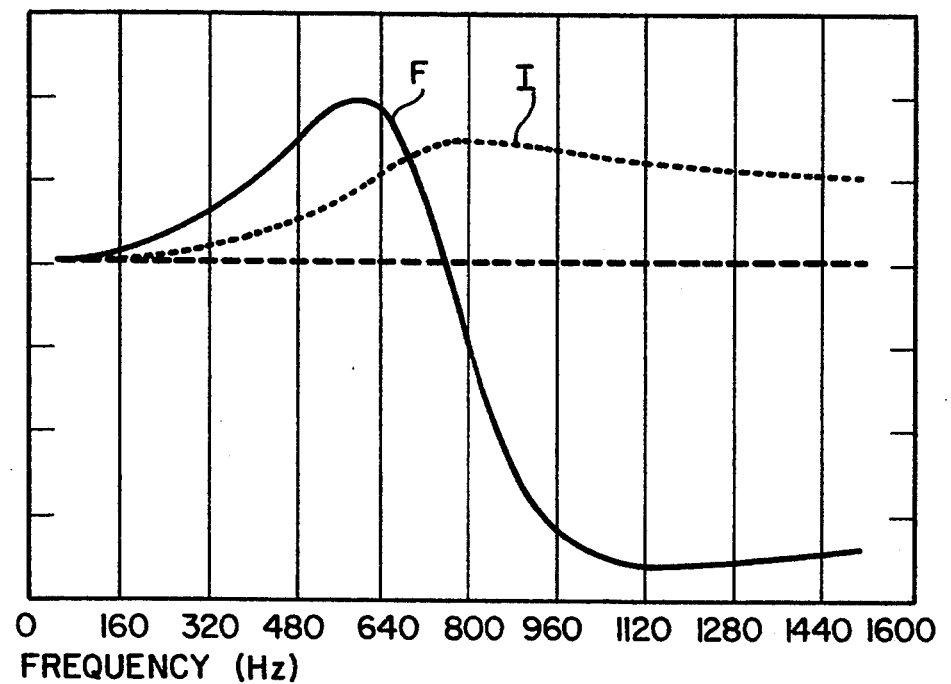

The series capacitors also have a substantial effect on the currents, fields, and forces in the apparatus. FIG. 6C and FIG. 6D are graphs which correspond to FIGS. 4 and 5, but they show the values which exist when capacitors are wired in series with the coils as shown in FIG. 6A. As shown in FIG. 6C the capacitor embodiment has substantially the same voltages E and magnetic fields B, higher and slightly phase-shifted currents I, and stronger restorative forces F than in the non-capacitor embodiment. The values shown in the graph of FIG. 6D undergo even greater changes with respect to FIG. 5. The current peaks at 800 Hz and then descends. The positive force peaks at around 600 Hz and drops sharply to a maximum negative force at around 1100 Hz. It is this negative force which restores the loops to their prescribed path, so the optimum operating frequency of a bearing having the characteristic curves of FIG. 6D is around 1100-1300 Hz.

FIGS. 7A and 7B show a passive magnetic bearing which has an air core rather than a ferrous core as was the case in the previously described embodiments of the invention. As seen in FIG. 7B, primary windings 60 are located on both sides of the rotor 61. The windings 60 have a radius $R_p$ which is greater than the radius $R_i$ of the inboard legs of the loops and less than the radius $R_o$ of the outboard legs of the loops. Thus, the primary windings 60 create magnetic fields with oppositely directed lines of flux which pass through each of the loops 62. Capacitors 63 are each wired in series with a respective loop. Alternating current at a same frequency and phase is supplied to the two primary windings 60.

The flux density attributable to the primary windings 60 will be greater radially inside these windings than radially outside these windings. To compensate for this differential, it is desirable but not essential to augment the magnetic field radially outside of the primary windings 60. Such augmentation is achieved by providing supplemental windings 64 in which the currents flow in directions which are opposite to the directions of current flow in their respective primary windings. This creates supplemental magnetic fields which increase the magnetic flux density outboard of the primary windings 60, preferably to provide equal flux densities both inboard and outboard of the primary windings 60.

In an air core bearing, the loops 62 should include series capacitors such as capacitors 56 in FIG. 6A to achieve satisfactory performance.

Figure 8A:
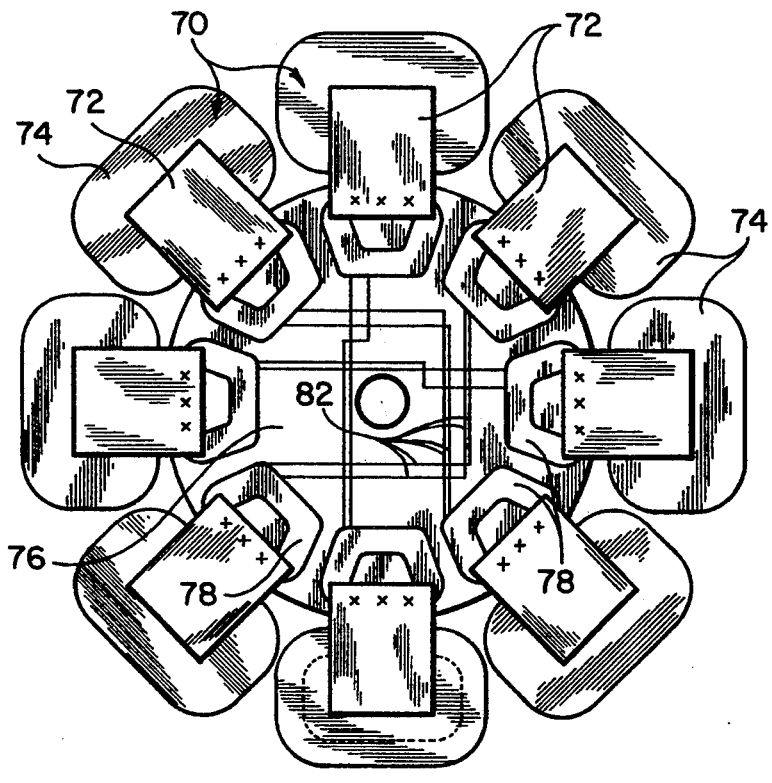
FIGS. 8A and 8B are diagrammatic front and sectional views of an embodiment of the invention in which all magnets have identical polarities, and diametrically opposed loops of the rotor are electrically connected to each other.
Figure 8B:
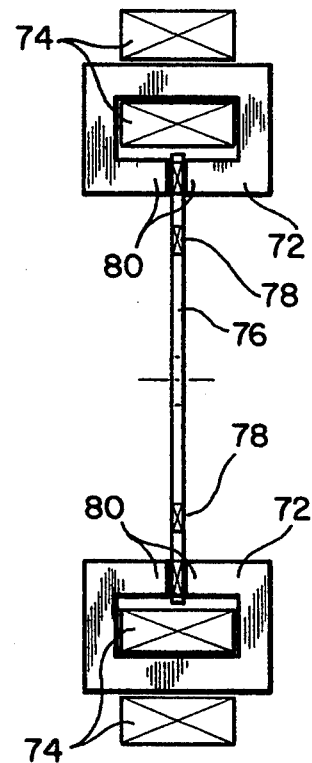

In the previously described embodiments, each loop is simultaneously exposed to two oppositely directed magnetic fields. In the bearing shown in FIGS. 8A and 8B, however, each loop is exposed to a single magnetic field at any point in time. Here it will be seen that there is a plurality of circumferentially spaced electromagnets 70. Each of these electromagnets has a C-shaped core 72 made of solid ferrite or stacked iron laminations, and windings 74 arranged to provide opposite poles on opposite faces of the rotor. Alternatively, the windings 74 may be arranged so that circumferentially adjacent magnets have opposite polarities.

The rotor 76 is provided with loops 78, the outer legs of which are aligned with the magnet poles 80 when the loops are following their prescribed paths. Conductors 82 connect diametrically opposed pairs of loops together in series so that induced current flowing clockwise in one loop will flow counterclockwise in the diametrically opposite loop. When the loops deviate from their prescribed paths, the induced currents will flow in the loops to set into motion the type of corrective action which was described in connection with FIGS. 1-3.

Figure 9:
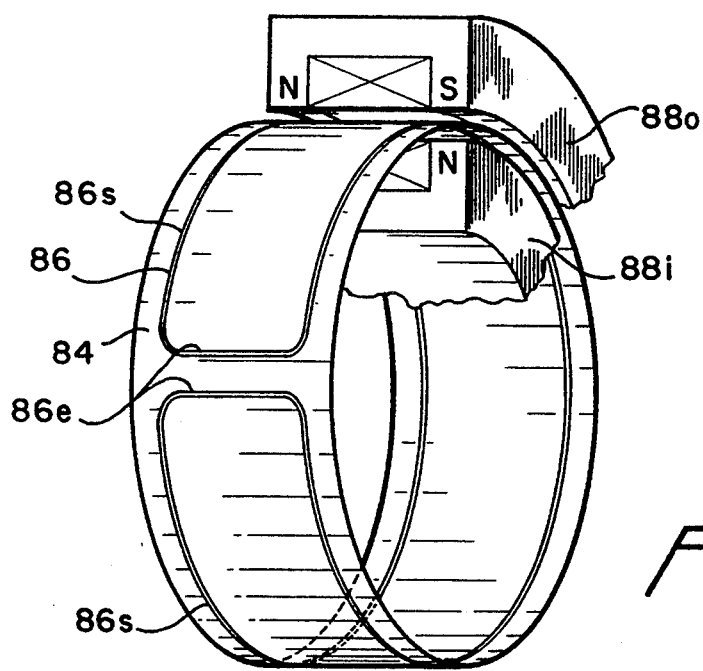
FIG. 9 is a diagrammatic perspective view of an embodiment of the invention in which an axial magnetic bearing has only a single loop.

FIG. 9 shows an axial bearing with a cylindrical rotor 84 which has only a single loop 86. The loop 86 has two side legs 86$s$ which extend almost entirely around the rotor, and two end legs 86$e$ which are closely adjacent to each other. Cylindrical electromagnets 88$i$ and 88$o$, only fragments of which are shown in FIG. 9, are located inside and outside the rotor 84. These magnets are alternating current electromagnets, and their poles are aligned with the side legs of the loop 86.

Whenever rotor 84 is displaced in an axial direction to displace the loop 86 from its prescribed path, the current induced in the loop 86 and the magnetic fields produced by the electromagnets 88$i$ and 88$o$ will cause a corrective action in a manner previously described.

It is believed that the primary utilization of the invention will be in connection with rotary bearings. However, bearings according to this invention may also be linear bearings in which the relative movement between the loop and magnet has a straight or noncircular curved path. In a simple linear bearing shown in FIGS. 10A and 10B, loops 90, fixed to a linearly movable carrier 92 are positioned between opposite pairs of magnetic poles 94 so that two magnetic fields of opposite directions pass through the interior of the loop. When the loop deviates from its prescribed path, a flow of current is induced in the loop to initiate the corrective action as previously described.

A linear bearing having only one magnetic field is shown in FIGS. 11A and 11B. Its loops are each formed of two sections 100, 102 which are at different lateral positions relative to the prescribed path of movement. The sections 100, 102 are fixed relative to each other on a carrier 103 and are electrically cross-connected in series by conductors 104 so that current flowing counterclockwise in a loop section 100 will flow clockwise in its connected loop section 102. Electromagnets 105 with C-shaped ferrous cores 106 and windings 107 connected to an alternating current power supply 108 are linearly aligned along the prescribed path of the loops.

Any vertical displacement of the loops 100, 102 relative to their prescribed horizontal path will cause an imbalance in the total flux passing through the electrically interconnected loops 100, 102. This induces the flow of current and it produces a corrective action which returns the loops to their prescribed paths.

As will be understood by persons skilled in this art, all of the foregoing embodiments of the invention work on the common principle that a loop is arranged and positioned where it is exposed to magnetic flux emanating from an electromagnet so that an electrical current will be induced in the loop whenever it deviates from its prescribed path. A power supply provides alternating current to the electromagnet so that the direction of the magnetic flux changes periodically. The frequency of the power supply is such that the magnetic flux interacts with the electrical currents induced in the loops to exert forces on the loops in a direction which is lateral with respect to their prescribed path. These forces tend to move any deviant loop laterally toward its prescribed path.

Persons familiar with the art will realize that the invention may take many forms other than those shown. The loops can travel in linear paths or noncircular curved paths, if the magnets are disposed along such paths. The loops may be stationary and the magnets may move. In a rotary radial bearing, it is not necessary for the loops to be positioned where their interior areas are subjected to equal flux from both poles. If unequal amounts of flux pass through the interior areas of the loops of a rotary radial bearing, lateral forces will continuously be exerted on the loops, but these forces will cumulatively have a centering effect because they all are radially oriented. They will be equal throughout the circumference of the disk in order to maintain the rotational axis at a desired position.

In view of the fact that the invention may be practiced in many ways other than the specific embodiments disclosed herein, it is emphasized that the invention embraces a wide variety of devices which fall within the spirit of the following claims.

We claim:

1. A magnetic bearing system, comprising,
   an electromagnet which has a first pole, a second pole, and electrical windings,
   a power supply for causing an electrical current to flow through said electrical windings to create magnetic flux which simultaneously flows in opposite directions at said first and second poles so that said first and second poles have opposite polarities,
   an object which includes closed loops of electrically conductive material, said closed loops being unconnected electrically to any electrical power supply,
   said object and said electromagnet being relatively movable so that said loops travel along a prescribed path relative to said electromagnet,
   each of said loops forming a boundary of a loop interior area, each of said loops being positioned where its interior area is simultaneously exposed to magnetic flux associated with both of said poles so that an electrical current will be induced in said loop whenever the flux associated with said first pole passing through its interior area is unequal to the flux associated with the second pole passing through its interior area,
   said power supply providing alternating current to said electromagnet so that the magnetic polarities of said first and second poles change periodically, said power supply operating at a frequency at which said magnetic flux associated with said poles interacts with said electrical currents induced in the loops to exert forces on the loops in directions which are lateral with respect to said path, tending to move any loop which deviates from said path toward said prescribed path in a lateral direction.

2. The magnetic bearing system according to claim 1 wherein said electro-magnet is stationary and said loops are movable.

3. The magnetic bearing system according to claim 1 wherein said first and second poles are circular.

4. The magnetic bearing system according to claim 1 wherein there is a plurality of said electromagnets.

5. The magnetic bearing system according to claim 1 wherein the power supply includes means for varying the frequency.

6. The magnetic bearing system according to claim 1 wherein the frequency is at least 500 Hz.

7. The magnetic bearing system according to claim 1 wherein the frequency is about 500 to 25000 Hz.

8. The magnetic bearing system according to claim 1 wherein the first and second poles are circular and are separated by a space, said electrical windings being located in said space.

9. The magnetic bearing system according to claim 1 wherein there are two said electromagnets which are located on opposite sides of said loops.

10. The magnetic bearing system according to claim 1 wherein said prescribed path is a circular path which has a central axis.

11. The magnetic bearing system according to claim 10 wherein said first and second poles face axially, and they are radially spaced from each other.

12. The magnetic bearing system according to claim 10 wherein said first and second poles face radially, and they are axially spaced from each other.

13. The magnetic bearing system according to claim 10 wherein there are two said electromagnets and at least two sets of said loops, a first said electromagnet having its poles facing radially toward a first said set of loops, a second said electromagnet having its poles facing axially toward a second said set of loops.

14. The magnetic bearing system according to claim 10 wherein, when all loops are on their prescribed paths, the flux associated with the first pole passing through the interior area of a loop is equal and opposite to the flux associated with the second pole passing through the interior area of the same loop.

15. The magnetic bearing system according to claim 1 in which at least two of said loops are spaced apart and are connected together in series.

16. A magnetic bearing system according to claim 1 in which each said loop is closed and it includes a capacitor connected in series thereto.

17. A magnetic bearing system according to claim 1 wherein said power supply operates at an operating frequency, said system having a capacitor connected in series with said power supply and with said electrical windings of the electromagnet so as to form an L-C circuit, said L-C circuit having a resonant frequency which is higher than the operating frequency, each said loop having a mutual inductance relationship with said electrical windings of the electromagnet so as to lower the overall inductance of the L-C circuit and to bring the L-C circuit toward a resonant condition when each loop is displaced from its prescribed path.

18. A magnetic bearing system, comprising,
    an electromagnet which has primary electrical windings,
    a power supply for causing an electrical current to flow through said primary electrical windings to create a field of magnetic flux,
    an object which includes a loop of electrically conductive material, said loop being unconnected electrically to any electrical power supply,
    said object and said electromagnet being relatively movable so that said loop travels along a prescribed path relative to said electromagnet,
    said loop forming a boundary of a loop interior area, said loop being arranged and positioned where it is exposed to said magnetic flux so that an electrical current will be induced in said loop whenever it deviates from its prescribed path,
    said power supply providing alternating current to said electromagnet so that the direction of the magnetic flux changes periodically, said power supply operating at a frequency at which said magnetic flux interacts with said electrical currents induced in the loop to exert forces on the loop in a direction which is lateral with respect to said path, tending to move the loop when it deviates from said path toward said prescribed path in a lateral direction.

19. A magnetic bearing system according to claim 18 wherein said power supply operates at an operating frequency, said system having a capacitor connected in series with said power supply and with said electrical windings of the electromagnet so as to form an L-C circuit, said L-C circuit having a resonant frequency which is higher than the operating frequency, said loop having a mutual inductance relationship with said electrical windings of the electromagnet so as to lower the overall inductance of the L-C circuit and to bring the L-C circuit toward a resonant condition when the loop is displaced from its prescribed path.

20. A magnetic bearing system according to claim 18 having a plurality of loops.

21. A magnetic bearing system according to claim 20 in which at least two of said loops are spaced apart along said prescribed path and are connected together in series.

22. A magnetic bearing system according to claim 18 in which said loop includes a capacitor connected in series thereto.

23. A magnetic bearing system according to claim 18 wherein the bearing is a rotary bearing which has an axis of rotation.

24. A magnetic bearing system according to claim 23 wherein said loop has two opposite legs of equal radii which extend substantially entirely around and are concentric with the axis of rotation.

25. A magnetic bearing system according to claim 18 having a ferrous core associated with said windings, said core having a first magnetic pole and a second magnetic pole.

26. A magnetic bearing system according to claim 25 wherein said loop has a leg which faces said pole and has a width substantially equal to that of said pole.

27. A magnetic bearing system according to claim 25 wherein said first and second poles are concentric with and lie on opposite sides of said windings.

28. A magnetic bearing system according to claim 27 wherein there are first and second said electromagnets which each have said windings, said ferrous cores, and first and second poles; said first electromagnet having its poles facing the poles of said second electromagnet; said loop lying between said first and second electromagnets.

29. A magnetic bearing system according to claim 18 wherein said loop has a center, said magnetic bearing system having a nonferrous core within said windings, said windings being substantially aligned with the center of said loop.

30. A magnetic bearing system according to claim 29 wherein said nonferrous core is an air core.

31. A magnetic bearing system according to claim 18 wherein said prescribed path is a circular path which has a central axis, said loop lying in a plane which is radial with respect to said axis.

32. A magnetic bearing system according to claim 31 wherein there are two said loops which are diametrically opposed and are connected together in series.

33. A magnetic bearing system according to claim 31 wherein said loop lies in a plane which is radial with respect to said axis, said magnetic bearing system having two said primary windings which are concentric with said axis and are axially spaced on opposite sides of said loop.

34. A magnetic bearing system according to claim 33 having, outboard of said primary windings, supplemental windings in which currents flow in directions which are opposite to the directions of current flow in the primary windings.

35. A magnetic bearing system according to claim 18 wherein said loop includes two sections which are electrically connected together in series and are at different lateral positions relative to said path.

36. A magnetic bearing system according to claim 18 having a plurality of electromagnets.

37. A magnetic bearing system according to claim 18 wherein said prescribed path is a circular path, said loop lying in a cylinder which is concentric with said circular path.

38. A magnetic bearing system, comprising,
a magnet which creates a field of magnetic flux,
an object which includes a loop of electrically conductive material, said loop being unconnected electrically to any electrical power supply,
said object and said magnet being relatively movable so that said loop travels along a prescribed path relative to said magnet,
said loop forming a boundary of a loop interior area, said loop being arranged and positioned where it is exposed to said magnetic flux so that an electrical current will be induced in said loop whenever it deviates from its prescribed path,
said magnetic flux interacting with said electrical currents induced in the loop to exert forces on the loop in a direction which is lateral with respect to said path, tending to move a loop when it deviates from said path toward said prescribed path in a lateral direction,
said loop having a capacitor connected in series thereto.

39. A magnetic bearing system according to claim 38 wherein said magnet is an electromagnet.

40. A magnetic bearing system according to claim 39 having a capacitor connected in series with said electromagnet.

41. A magnetic bearing system according to claim 38 having a plurality of loops.

* * * * *